United States Patent [19]

Hitotsumatsu et al.

[11] Patent Number: 5,290,579
[45] Date of Patent: Mar. 1, 1994

[54] PROCESS FOR PRODUCING RICE BRAN OIL

[75] Inventors: Hisashi Hitotsumatsu; Yasuhiko Takeshita, both of Tokyo, Japan

[73] Assignee: Tokyo Oil Mills, Inc., Tokyo, Japan

[21] Appl. No.: 870,912

[22] Filed: Apr. 20, 1992

[30] Foreign Application Priority Data

Apr. 19, 1991 [JP] Japan .................................. 3-115575

[51] Int. Cl.⁵ ................................................ A23D 9/02
[52] U.S. Cl. ..................................... 426/489; 426/495
[58] Field of Search ............... 426/489, 417, 542, 463, 426/474, 475, 486, 495

[56] References Cited

U.S. PATENT DOCUMENTS 5,175,012 12/1992 Shin ...................................... 426/489

OTHER PUBLICATIONS

Suzuki et al, *The Japanese Journal Nutrition*, vol. 20, No. 4, pp. 139–141, Jul., 1962.

Takeshita et al, *Recent Technical Advances in Rice Bran Oil Processing*, vol. 21, (1988).

Takeshita et al, *Study on the Identification of Rice Bran Oil*, vol. 18 (1985).

Robert J. Nicolosi, Ph.D., American Heart Association's Eighteenth Science Writers Forum, (1991).

*Primary Examiner*—Carolyn Paden
*Attorney, Agent, or Firm*—Sughrue, Mion, Zinn, Macpeak & Seas

[57] ABSTRACT

A process for producing an unsaponifiable matters-enriched rice bran oil which comprises recovering unsaponifiable matters and ferulates from the residue obtained by collecting edible oil during the refining process of rice bran oil, concentrating the unsaponifiable matters and ferulates thus recovered, esterifying the same if desired, and adding the product obtained to edible rice bran oil, with the unsaponifiable matters-enriched edible rice bran oil thus obtained having improved qualities and exhibiting excellent physiological functions.

3 Claims, No Drawings

PROCESS FOR PRODUCING RICE BRAN OIL

FIELD OF THE INVENTION

This invention relates to a process for producing an edible rice bran oil. More particularly, it relates to a process for producing an edible rice bran oil having improved physiological functions.

BACKGROUND OF THE INVENTION

It is reported in The Japanese Journal of Nutrition, Vol. 20, No. 4, Pages 139-141, July, 1962 and Robert J. Nicolosi, The Summary presented at Georgia Rice Council in Jan. 13-16, 1991 that the intake of rice bran oil (as defined in JAS (Japan Agricultural Standards) 554, notified in the Ministry of Agricultural and Forestry) causes a remarkable decrease in harmful cholesterol level while not reducing but, on the contrary, increasing the so-called benign cholesterol in vivo. It is considered that rice bran oil contains a large amount of unsaponifiable matters which would exert useful physiological effects on human body.

In general, crude rice bran oil has a high acid value and can be refined to an edible level only at an extremely low yield of about 70%, compared with common edible vegetable oils which can be refined at a yield of 90% or above. Crude rice bran oil contains 5 to 6% of unsaponifiable matters which seemingly exert physiologically useful effects. However, the amount of these unsaponifiable matters present in edible rice bran oil, which has been refined by alkali refining, dewaxing, decoloring, deodorizing and/or finally filtering, is reduced to 2.5 to 3.5%. Namely, most of these unsaponifiable matters are not utilized but are disposed of. Further, crude rice bran oil contains about 2% of ferulates which may be similarly useful from a physiological viewpoint. However, the amount of ferulates in edible rice bran oil is reduced to about 0.1%. Namely, most of these ferulates are merely used as a starting material for producing oils for industrial use in the form of ferulic acid salts or a soapstock obtained as a by-product or in combination with other appropriate fatty acids.

Hitherto, the residue obtained in the refining process of rice bran oil is disposed but not effectively utilized, and therefore, a physiologically active substance (e.g., a phenolic substance) present therein tended to be removed together with useless materials. In general, a process which comprises recovering and concentrating the physiologically active substance from the residue in a suitable state, and adding the obtained product to a common edible rice bran oil refined has not been carried out because it is considered that impurity will become put back into the refined product.

SUMMARY OF THE INVENTION

An object of the present invention is to produce an unsaponifiable matters-enriched rice bran oil having excellent physiological functions.

According to the present invention-, the above-mentioned object is achieved by a process for producing an unsaponifiable matters-enriched rice bran oil which comprises recovering unsaponifiable matters and ferulates from the residue obtained by collecting edible oil during the refining process of rice bran oil, concentrating the unsaponifiable matters and ferulates thus recovered and adding the obtained product to edible rice bran oil.

DETAILED DESCRIPTION OF THE INVENTION

The residue obtained in the refining process of rice bran oil as described, for example, in Y. Takeshita, et. al., Transactions of the Kokushikan Univ. Faculty of Engineering, No. 21, Pages 118-124 (1988) and Y. Takeshita, et. al., Transactions of the Kokushikan Univ. Faculty of Engineering, No. 18, Pages 29-34 (1985), (i.e., the above-mentioned soapstock formed as a by-product or unsaponifiable components in the fatty acid residue) may be recovered and concentrated using common chemical and/or physical procedures, for example, extraction with a solvent, chromatographic separation, pressing, evaporation or similar treatments. The unsaponifiable matters and ferulates thus obtained are added to an edible rice bran oil, which is produced by a conventional method, to produce a concentration of from 0.5 to 5.0% by weight. Thus an edible rice bran oil having a uniform and beautiful appearance and showing improved physiological functions can be obtained. The unsaponifiable matters may be further esterified, if desired.

The following non-limiting Examples are given to further illustrate the present invention in greater detail. Unless otherwise indicated herein, all parts, percents, ratios and the like are by weight.

EXAMPLE 1

To 2.0 kg of a crude rice bran oil (acid value: 25, moisture and impurity contents: 0.5 wt %, made from a Japanese-grown rice), was added the acid value equivalent amount of 12 wt % aqueous sodium hydroxide solution. The mixture was heated at 75° C. for 3 hours with stirring. After centrifuging, 1.5 kg of the supernatant fraction was separated to obtain a first deacidified oil having an acid value of 2.0.

To the thus obtained first deacidified oil, 8 wt % aqueous sodium hydroxide solution was added in an amount of 2 times as much as that corresponding to the amount of a free fatty acid present therein. The mixture was subjected to a second deacidification to obtain 50 g of a soapstock. The resulting soapstock was further saponified with an aqueous sodium hydroxide solution. Then unsaponifiable matters in the product obtained were extracted with hexane at 40° C. to obtain a deacidified soapstock containing 30 wt % of unsaponifiable matters.

15 g of the unsaponifiable matters thus obtained was added to the second deacidified oil washed with water. The resulting oil was filtered at an ordinary temperature, and then subjected to bleaching (i.e., thermal filtration at 90° C. using 2 wt % of activated clay), deodorization (i.e., steam blowing under a reduced pressure of 3 mmHg at 230° C. for 2 hours) and polishing (i.e., filtration with a filter paper at an ordinary temperature) to thereby produce an unsaponifiable matters-enriched rice brain oil useful as an edible oil having excellent physiological functions.

EXAMPLE 2

15 g of the unsaponifiable matters obtained in Example 1 above were esterified with the equivalent amount of oleic acid in the presence of 0.1 wt % of sodium hydroxide. Thus esters of the unsaponifiable matters were obtained. This product was added to the second deacidified oil, and then subjected to the bleaching, deodorization and polishing processings in the same manner as in Example 1 to thereby produce excellent edible rice bran oil having improved physiological functions in a good state.

TEST EXAMPLE 1

Nine adults were divided into three groups A, B and C which each consists three men. A conventional refined rice bran oil and the unsaponifiable matters-enriched rice bran oil obtained in Example 1 were each blended with a food mainly comprising carbohydrate and protein (about 1800 kcal/day) and orally administered for 7 days at a dose of 60 g/day (designated as Group A and Group B, respectively).

As a control, food with no rice bran oil was orally administered (designated as Group C).

The changes in plasma cholesterol levels of Groups A, B and C were measured.

The results are shown in Table 1.

TABLE 1

| Group | Plasma Cholesterol Levels (mg/dL) |
| --- | --- |
| A (Comparison) | 173 |
| B (Invention) | 162 |
| C (Control) | 196 |

From the results shown in Table 1, it can be seen that the unsaponifiable matters-enriched rice bran oil according to the present invention has an excellent cholesterol lowering effect as compared with the conventional rice bran oil.

According to the present invention, unsaponifiable matters obtained during the refining process of rice bran oil, which have been disposed hitherto, can be advantageously utilized and, as a result, an unsaponifiable matters-enriched edible rice bran oil having improved qualities and showing excellent physiological functions can be obtained.

When the unsaponifiable matters-enriched edible rice bran oil is used, a neutral fat content can be reduced in accordance with the increase of the intake of the unsaponifiable matters. Further, the intake of the unsaponifiable materials-enriched rice bran oil causes a decrease in LDL level while not reducing HDL level, to thereby prevent an arteriosclerosis.

While the invention has been described in detail and with reference to specific embodiments thereof, it will be apparent to one skilled in the art that various changes and modifications can be made therein without departing from the spirit and scope thereof.

What is claimed is:

1. A process for producing an unsaponifiable matter-enriched rice bran oil, comprising the steps of:
    a) refining rice bran oil, to obtain edible rice bran oil and residue,
    b) recovering and concentrating unsaponifiable matter and ferulates from said residue,
    c) adding said unsaponifiable matter and ferulates to said edible rice bran oil,
    so as to produce an unsaponifiable matter-enriched rice bran oil.

2. The process of claim 1, wherein said unsaponifiable matter and ferulates is esterfied subsequent to step (b) and prior to step (c).

3. The process of claim 1, wherein, in step (c), said unsaponifiable matter and ferulates is present in a concentration of 0.5 to 5.0% by weight of said unsaponifiable matter-enriched rice bran oil.

* * * * *